United States Patent [19]

Hauser

[11] Patent Number: 5,528,958
[45] Date of Patent: *Jun. 25, 1996

[54] HEAVY DUTY TRANSAXLE

[75] Inventor: Raymond Hauser, Decatur, Ill.

[73] Assignee: AGRI-FAB, Inc., Sullivan, Ill.

[*] Notice: The term of this patent shall not extend beyond the expiration date of Pat. No. 5,392,670.

[21] Appl. No.: 386,987

[22] Filed: Jan. 20, 1995

Related U.S. Application Data

[63] Continuation of Ser. No. 954,602, Sep. 30, 1992, Pat. No. 5,392,670, which is a continuation of Ser. No. 541,321, Jun. 21, 1990, abandoned.

[51] Int. Cl.⁶ ............................. F16H 47/00; F16H 57/02
[52] U.S. Cl. ............................. 74/606 R; 475/83
[58] Field of Search ............................. 475/83, 198, 206; 74/606 R

[56] References Cited

U.S. PATENT DOCUMENTS

| | | | |
|---|---|---|---|
| 4,862,767 | 9/1989 | Hauser | 475/83 |
| 5,046,994 | 9/1991 | Hasegawa et al. | 475/83 |
| 5,078,659 | 1/1992 | Von Kaler et al. | 475/83 X |
| 5,125,291 | 6/1992 | Makita et al. | 475/83 X |
| 5,230,519 | 7/1993 | Nishimura et al. | 475/83 |
| 5,289,738 | 3/1994 | Szulcuzewski | 475/83 X |
| 5,392,670 | 2/1995 | Hauser | 74/606 R |

*Primary Examiner*—Khoi Q. Ta
*Attorney, Agent, or Firm*—Tom McDonough; Gary Jarosik

[57] ABSTRACT

A heavy duty hydrostatic transmission having an input into a combined separable pump/motor driven through a shaft in the transmission housing and a "U" shaped double back space conserving gear reduction drive to the axle differential.

19 Claims, 5 Drawing Sheets

HEAVY DUTY TRANSAXLE

This application is a continuation of application Ser. No. 07/954,602 filed on Sep. 30, 1992, now U.S. Pat. No. 5,392,670, which was a continuation of Ser. No. 07/541,321, filed Jun. 21, 1990, now abandoned.

FIELD OF THE INVENTION

This invention relates to a heavy duty transaxle unit for ground care equipment including tractors.

BACKGROUND OF THE INVENTION

Hydrostatic transaxles are efficient and serviceable devices for transmitting power from an engine to the remote drive wheels of a vehicle. The manufacturer of the vehicle gets an all in one power unit needing only a belt to an engine to complete the drive train while the consumer gets an easy to operate, fairly reliable speed and direction control mechanism. However, hydrostatic transaxles have limitations in addition to presenting size and mounting difficulties. These combine to limit the number of applications in which hydrostatic transaxles presently are utilized. In addition, the customary use of a separate hydraulic power unit increases the cost of the transaxles.

The present invention is directed to providing a strong, adaptable, heavy duty hydrostatic transaxle.

SUMMARY OF THE INVENTION

The present invention is directed to providing a heavy duty hydrostatic transaxle.

It is an object of this invention to increase the torque carrying capabilities of hydrostatic transaxles.

It is an object of this invention to increase the adaptability of hydrostatic transaxles.

It is an object of this invention to simplify heavy duty hydrostatic transaxles.

It is an object of this invention to reduce the complexities of hydrostatic transaxles.

It is an object of this invention to reduce the complexity of auxiliary power drives in hydrostatic transaxles.

It is an object of this invention to reduce the cost of heavy duty hydrostatic drive trains.

Other objects and a more complete understanding of the invention may be had by referring to the following specification and drawings in which:

DESCRIPTION OF THE PREFERRED EMBODIMENT

This invention relates to a heavy duty hydrostatic transaxle. The invention will be described in the preferred embodiment of a heavy duty transaxle 10 for garden tractors. The transaxle 10 includes a casing 11, an input shaft 12, a hydrostatic power unit 13, an output brake shaft 14, two idler shafts 15 and 16, a differential 17, and output half axle shafts 18. The casing of the hydrostatic power unit 13 may or may not be integral with the casing 11 of the transaxle.

The casing 11 of the transaxle is designed to mount the transaxle 10 to the vehicle frame while retaining all of the operative parts of the transaxle 10 in position in respect to each other. The casing 11 shown is of two part cast aluminum construction having a vertical laterally extending parting line between two deep drawn housing castings 20 and 21. The use of vertical deep drawn castings produces a transaxle which is stronger for this particular application than a housing having a horizontal parting line, albeit at a cost of slightly more intricate machining. This vertical casting design also removes the torque loads of the shafts from parting lines, thereby strengthening the bearing seats for such shafts. Other types of casting designs could also be used with the invention.

The particular casing 11 shown is a sealed casing 11 designed to be utilized in any of a variety of positions with the longitudinal axis of the hydrostatic power unit 13 being at a predetermined angle in respect to the plane of the ground. These angles include parallel to the ground (as shown—suitable for use with a vertical drive engine) or perpendicular to the ground (suitable for use with a horizontal shaft drive from an engine). The transaxle could also be set at other angles. This feature allows the heavy duty hydrostatic transaxle 10 to be utilized in a wide variety of individual applications with differing drive connections to the engine.

In addition to mounting the transaxle 10 to the vehicle frame, the casing 11 also retains all of the operative parts of the transaxle in their proper respective positions. These parts include the input shaft 12, the hydrostatic power unit 13, the power/brake shaft 14, the two reduction shafts 15 and 16, the differential 17, and the output half shafts 18.

The hydrostatic power unit 13 may be a separate bolt on unit (FIG. 1) or an integral unit (FIG. 6), both of which are later described. Each has its advantages. The separate power unit of FIG. 1 can be purchased separately for bolt on incorporation into the transaxle. This reduces the cleanliness requirements etc. for the place of assembly of the transaxle as well as allowing easy field replacement of the power unit without removal and/or disassembly of the transaxle. The integral power unit of FIG. 6 allows the transaxle to be smaller and stronger with fewer parts and of lower cost.

The input shaft 12 provides the input torque for the hydrostatic power unit 13. In the particular embodiment shown, the input shaft 12 is driven by a bevel gear connection 30, 31 to an input power shaft 19. Casing 11 forms a first chamber 81 for the bevel gears 30 and 31 separate from a second internal chamber 82 for the reduction gears. The input power shaft 19 in turn extends externally of the casing 11 for interconnection with the source of power for the transaxle 10 (i.e. the engine). Due to the design of the transaxle 10, it is suitable for use with varying sources of power. In the preferred embodiment disclosed, the input power shaft 19 is driven by a pulley 25 which is fixedly mounted to the externally extending portion of the input power shaft 19. This pulley 25 is in turn connected by a belt 100 to a pulley 101 on the downwardly extending shaft of the vertical shaft engine 102 that is separately mounted to the frame (not shown). A master clutch may or may not be included in this connection to the engine. In the embodiment shown, the belt 100 to the pulley 25 is connected by a clutch to the engine 102, and the size of the pulley 25 is chosen such that the input power shaft 19 rotates at approximately 3,600 RPM at a normal operating speed for the engine.

Figure 2:
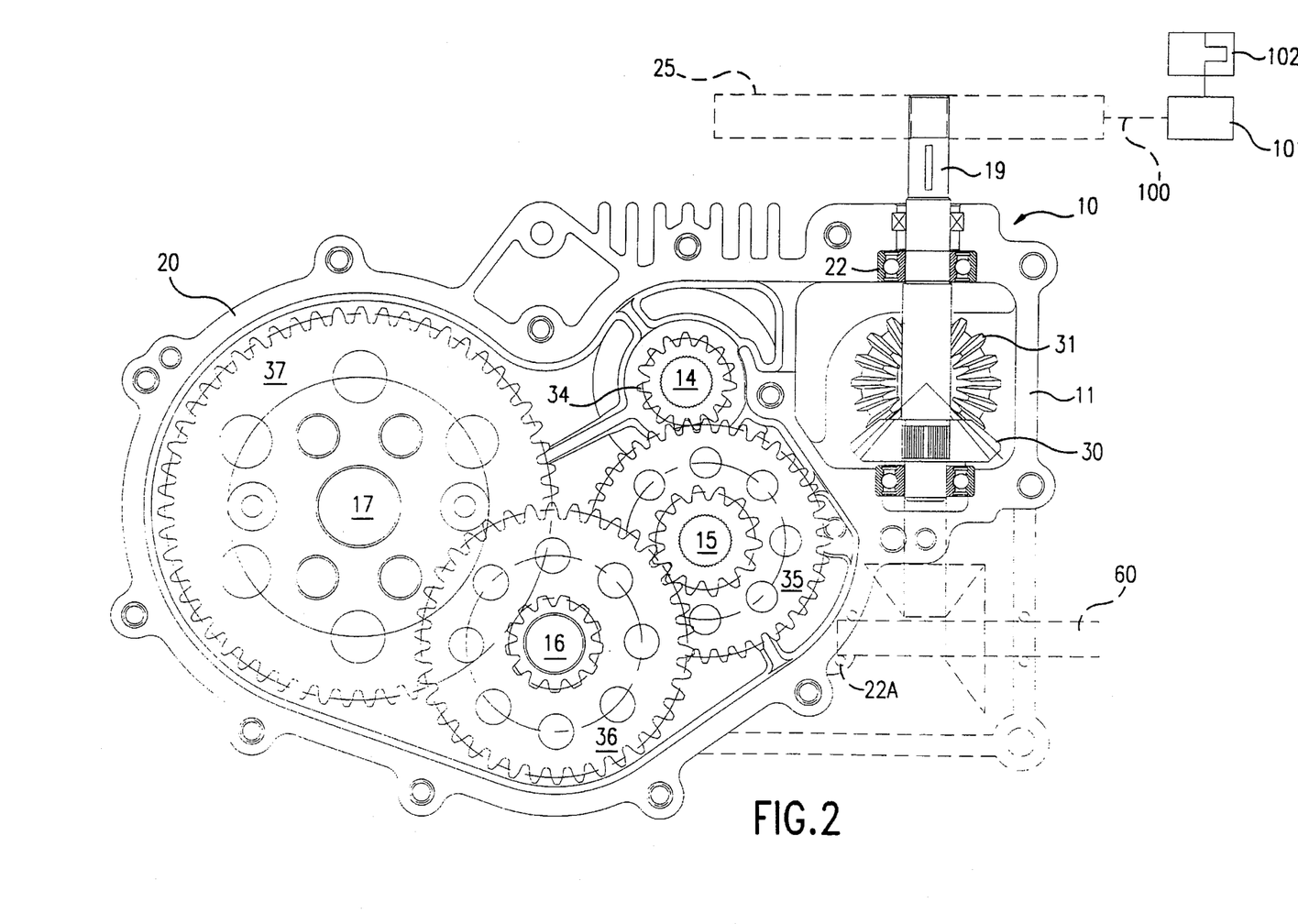
FIG. 2 is a central lateral cross sectional view of the transaxle of FIG. 1 taken generally along lines 2—2 of that figure.
Figure 3:
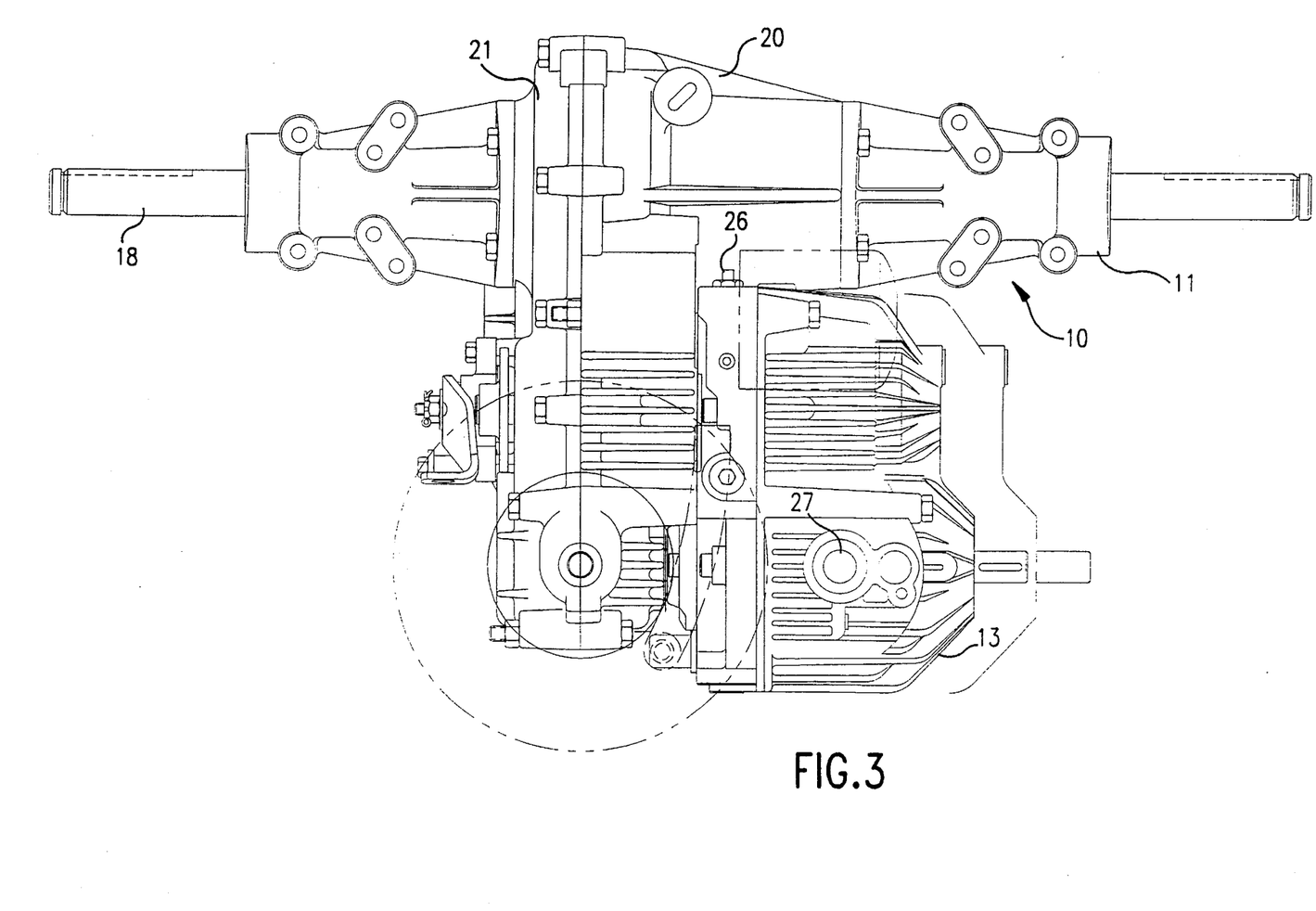
FIG. 3 is a downward view of the complete hydrostatic transaxle of FIG. 1.
Figure 4:
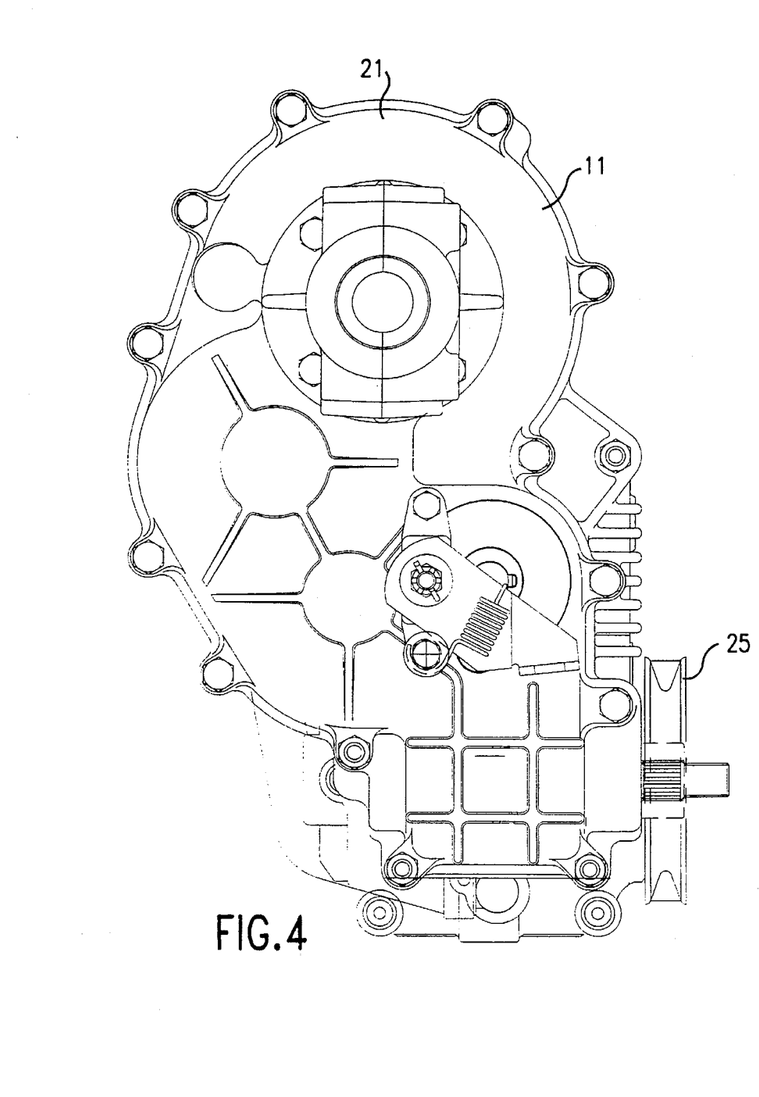
FIG. 4 is a lateral side view of the left side of the hydrostatic transaxle of FIG. 3.
Figure 5:
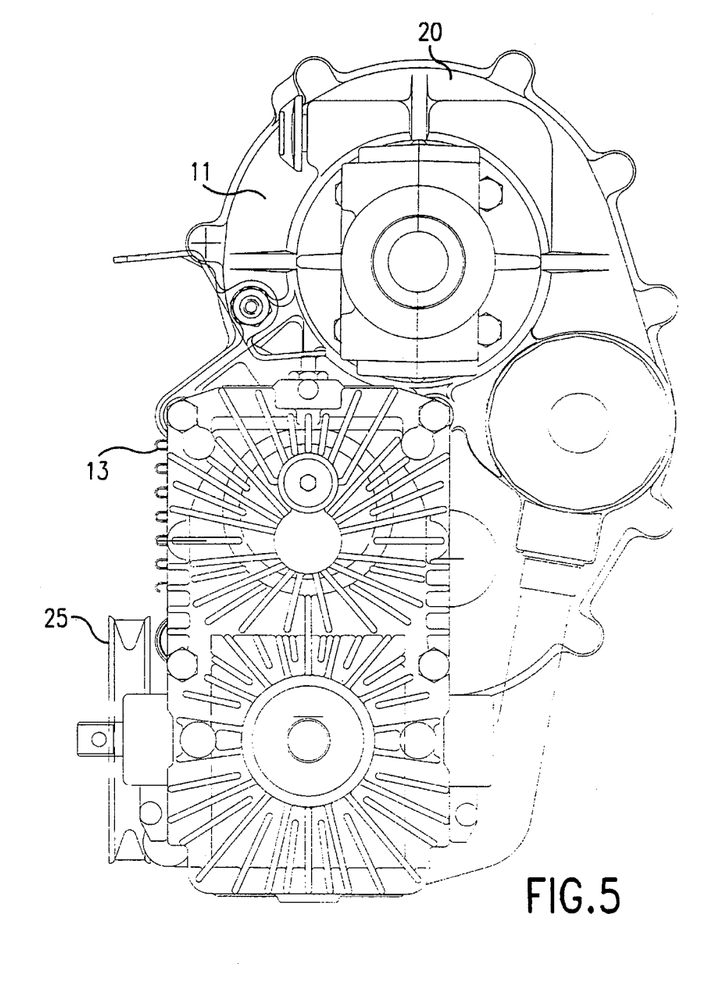
FIG. 5 is a lateral side view of the right side of the transaxle of FIG. 3; and, FIG. 6 is a cross sectional view of a hydrostatic transaxle like FIG. 1 incorporating an integral hydrostatic power unit.

In the preferred embodiment disclosed, the input power shaft 19 has an axis of rotation which is substantially perpendicular to the ground. In alternate embodiments, the axis of rotation of the shaft 19 could be parallel or at other differing angles to the ground in order to meet the design requirements of a particular application. This may or may not involve the rotation of the casing 11 around the half shafts 18 as well. As shown in dotted lines in FIG. 2, the transmission 10 could also be driven from a shaft 60 extending off of the front of the casing 11 or another method as well with a minor modification to the housing.

The input power shaft 19 is mounted to the casing by ball bearings 22. These ball bearings 22 reduce the rotational friction for the shaft 19 in addition to providing support for the torque loads generated by the input power shaft's bevel gear 30 (connected to the bevel gear 31 of the input shaft 12).

The input shaft 12 drivingly interconnects the input power shaft 19 to the hydrostatic power unit 13 in order to provide the input power for such power unit 13.

Figure 1:
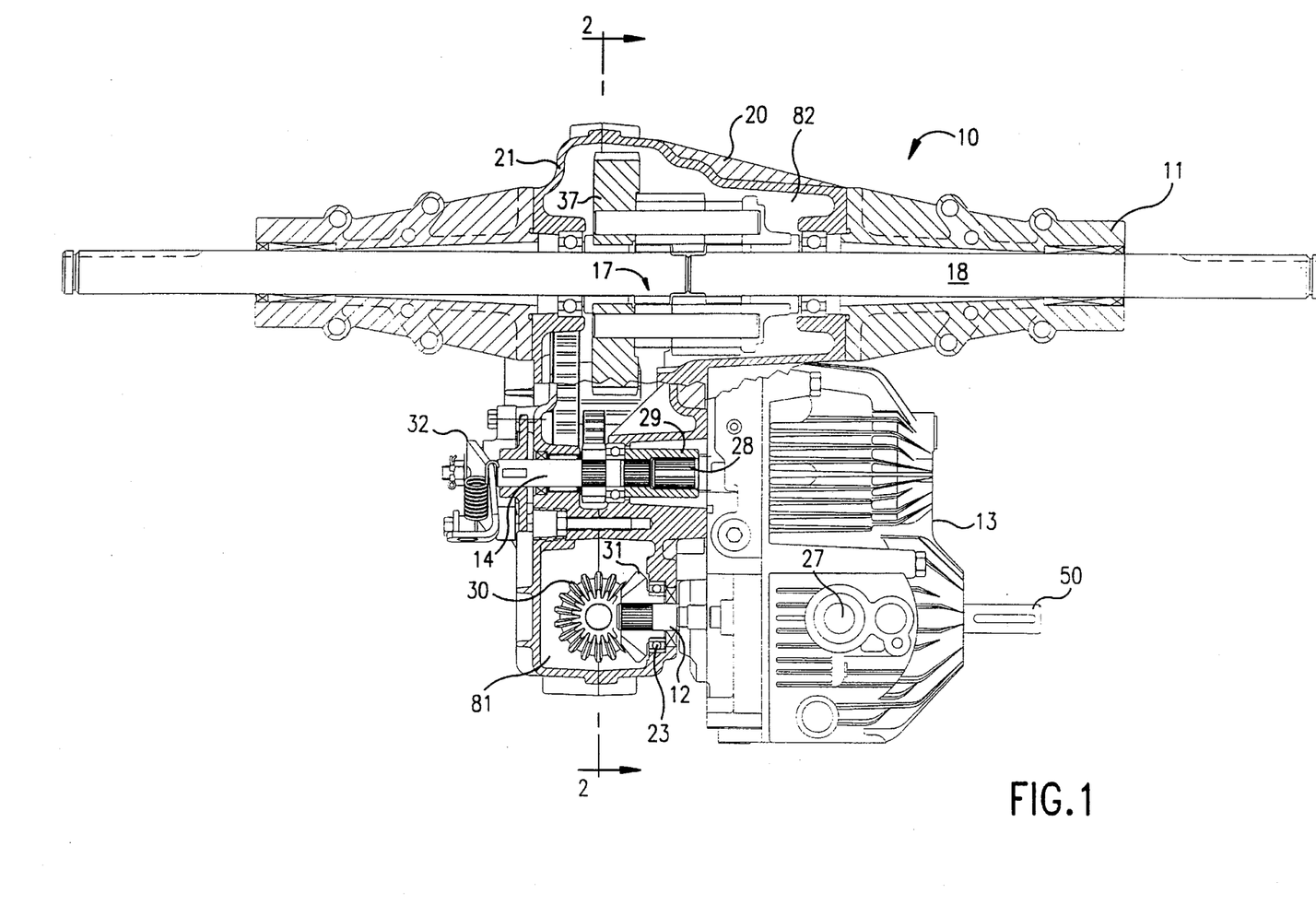
FIG. 1 is a cross sectional view of a hydrostatic transaxle incorporating the invention.

In the separate bolt on unit of FIG. 1, the input shaft 12 is releasably directly connected to the bevel gear 31 within the confines of the transaxle casing 11. This design reduces the lateral width of the transaxle by eliminating the need for a separate coupling external to the casing 11 of the transaxle 10. (Although if desired such a separate coupling could be utilized.) This design allows the power unit 13 to be attached to the transaxle casing 11 after construction. It, in addition, allows the power unit 13 to be subsequently removed for repair and maintenance. Ball bearings 23 are located directly between the bevel gear 31 and the casing 11 in order to provide rotary and other support for such bevel gear 31. This use of a bearing directly between the bevel gear 31 and the casing 11 reduces the torque induced loads on the input shaft 12 for the hydrostatic power unit. This enables one to utilize a single bearing support for the bevel gear 31 while also allowing for the selective disconnection of the input shaft 12 from such bevel gear 31. Two additional bearings (not shown) support the input shaft 12 within the casing of the separable power unit 13.

Figure 6:
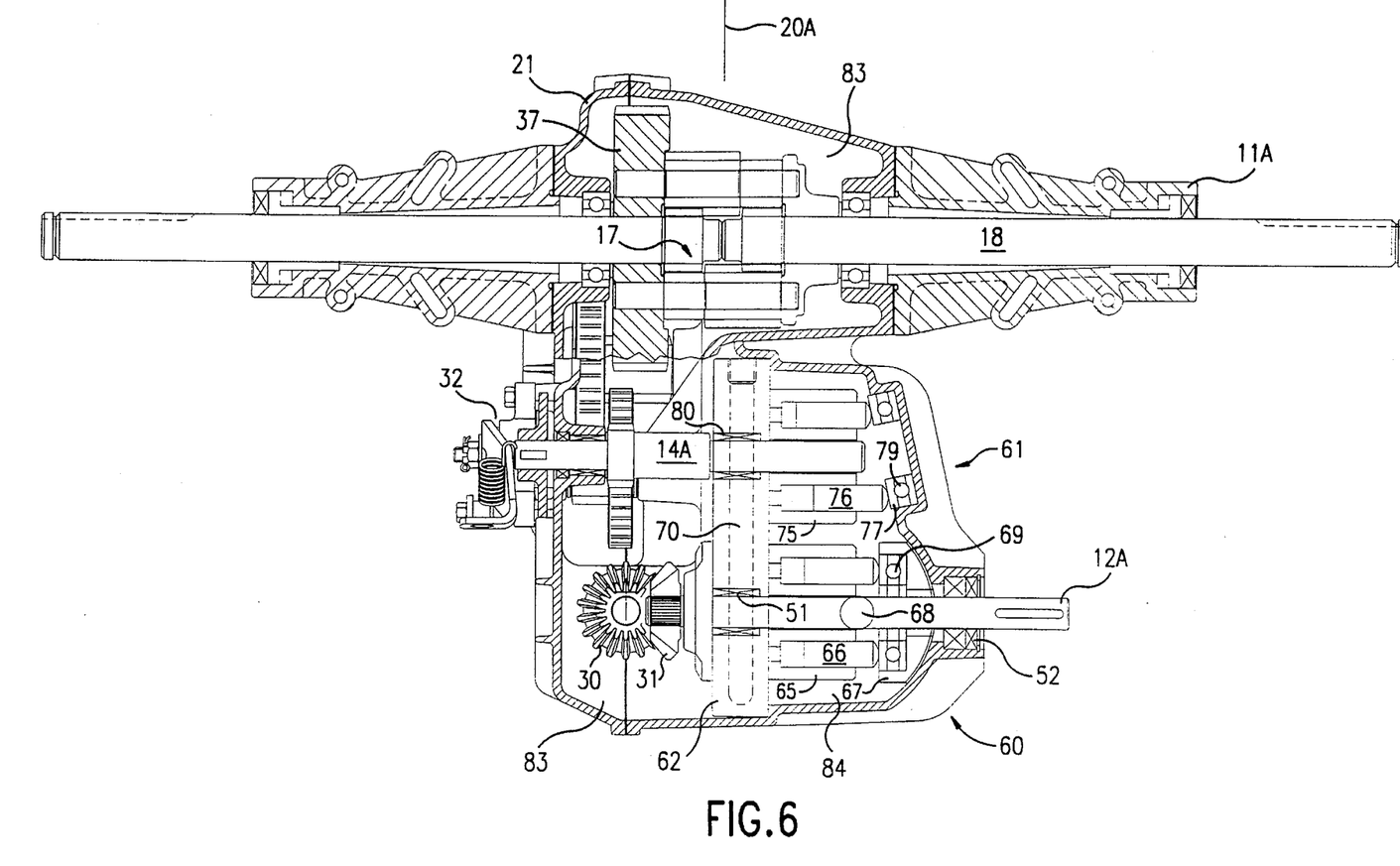

In the self contained hydrostatic power unit 13A of FIG. 6, the bevel gear 31 is directly supported by the input shaft 12A. This shortens the width of the power unit. The input shaft 12A is itself supported by a bearing 51 to the pressure passage center section 62 (later described) and bearing 52 to the end wall of the casing 20A (in comparison to the larger bearing 23 of FIG. 1). This reduces the diameter (and cost) of this bearing. Note that since the power unit 13A is integral with the casing 11A, a single wall (the pressure passage center section 62) is located between the power unit 13A and the rest of the transaxle forming a second chamber 84 separate from said first chamber 83. Note that in either embodiment of FIG. 1 or 6, the shaft 12 can extend across the casing 11 to the opposite side of the gear 30 to add an additional bearing if desired. In any event, a physical location near to the bevel gear 31 is preferred so as to keep this gear in a solid mechanical engagement with the bevel gear 30.

In addition to providing power for the hydrostatic power unit 13, the input shaft 12 also provides power for a power take off 50 taken from the hydrostatic power unit 13. In the preferred embodiment disclosed, this is accomplished by extending the shaft 12 through the hydrostatic power unit 13 for extension beyond such power unit. This extension revolves at the same speed as the input power shaft 12 (being integral therewith) whenever the input power shaft 12 is rotated. This allows one to interconnect a mower or other auxiliary unit to the engine of the vehicle for selective operation without the incorporation of further drives within the vehicle itself. A separate clutch between the power takeoff 50 and the auxiliary unit is preferred as to provide for a power takeoff separate from the engine shaft. Note that a continuous power takeoff disengageable at the same time as the input power shaft 19 could be provided by using a master clutch (to the pulley 25 in the embodiments disclosed).

The hydrostatic power unit 13 is the main power transfer unit for the heavy duty transaxle 10. This hydrostatic power unit 13 takes the torque from the constant speed input shaft 12 to produce a variable speed output on the hydro output shaft 28. The speed and direction of the rotation of this shaft 28 are dependent upon the angle of the control connection 27 in respect to the power unit 13.

In the embodiment shown in FIG. 1, the hydrostatic power unit 13 is a Sundstrand Model # BDU 21L or BDU 10L, removably mounted onto the side of the casing 11 via bolts. This Sundstrand unit has a rotary speed and direction control input 27 and a free wheel control 26. The rotary control input 27 is connected to an operator manipulative control lever through a shaft (not shown) for operator control of the speed and direction of the hydrostatic power unit 13 (and thus the vehicle with which the transaxle 10 is associated). Other types of self contained hydraulic pump/motors could also be utilized. Note that if desired, the power unit 13 could be separated into two sections with the pump separated from the motor thereof. This separation would be suitable for remote power applications (an example—when the physical space for the transmission made such application desirable; additional example—when one desires to drive many hydraulic motors from a common pump). In addition, other power units 13 could be substituted (an example—the use of an electric motor with a battery power source in a golf cart; additional example—other types of engines).

The output 28 of the separate hydro power unit 13 is connected to the output shaft 14 via a disengageable coupling 29. Due to the existence of this coupling 29 in respect to the shaft 28 and the disengageable splined connection between the shaft 12 and the bevel gear 31, the separate hydro power unit 13 can be removably disengaged from the casing 11 without compromising the integrity or strength of such casing (or the shaft bearings et al). This allows the separate hydro power unit to be manufactured, installed, removed, repaired, and/or replaced without compromise to the vehicle upon which the transmission 10 is mounted.

In the embodiment shown in FIG. 6, the hydrostatic power unit 13A is self contained. For this reason, the pistons and other operative parts of the hydrostatic power unit 13A cooperate directly with the casing 11A instead of a separate hydrostatic power unit casing to provide for a power transfer between the input shaft 12 and output shaft 14. The actual pistons and other operative parts are similar in operation to those contained in the Sundstrand Model BDU 21L or BDU 10L power units 13 of FIG. 1: The primary difference between FIGS. 1 and 6 lies in the incorporation of the casting for the power unit 13A integrally into the casing 11A for the transmission. (Note that the angles for swash plate grooves for the power unit 13A are preferably machined into the casing 11A after casting. While this adds a manufacturing step, it is preferable in performance.)

The self-contained transmission of FIG. 6 includes a pump section 60, a motor section 61, and the pressure passage center section 62. These parts are contained within the casting 20A. (The casting 21 is identical for both embodiments.)

The pump section 60 includes a rotatable drive member 65, a series of pump pistons 66, an angular movable swash plate 67 and a speed/direction control 68. The rotatable drive member 65 is fixedly connected to the input shaft 12A for rotation therewith. The pump pistons 66 are located in cylinders within the drive member 65 with protruding ends adjacent to the swash plate 67. By angularly adjusting this swash plate 67, the length of stroke and timing of stroke for the pump pistons 66 can be altered to provide for forward, neutral and reverse output from the pump section 60 (neutral, no piston movement shown). The angular positioning of the swash plate 67 is controlled by the speed/direction control 68. A bearing 69 reduces wear on the piston ends.

The output of the pump section 61 is fed from the cylinders directly to passages 70 in the pressure passage center section 62. The passages 70 in the center section 62 in turn feed to the cylinders of the motor section 61 (later described). Substantially all of the fluid passages for the power unit 13A are in this center section 62. This facilitates the manufacture of these passages by allowing construction separate from the casing 11A. It also allows the critical parts of the power unit 13A (pump, motor and center section) to be assembled in a different operation than the rest of the transmission. The center section 62 is separate from the transaxle casing 11A and is bolted into place in respect thereto.

The motor section 61 includes a rotatable driven member 75, a series of motor pistons 76 and a fixed swash plate 77. The rotatable driven member 75 is fixedly connected to the output shaft 14A for rotation therewith. The motor pistons 76 are located in cylinders within the driven member 75 with protruding ends adjacent to the swash plate 77. As the swash plate 77 in the embodiment shown is fixed, the displacement of the motor section 61 is also fixed (an adjustable swash plate could be incorporated in addition to/instead of the motor section 61 if desired). Again, a bearing 79 reduces wear on the ends of the pistons.

In this self-contained transmission of FIG. 6, the effective displacement and output direction of the pump section 60 is altered by angularly adjusting the movable swash plate 67 (via the control 68) so as to alter the volume and direction of fluid passing through the passage center section 62 to the fixed displacement motor section 61. This allows speed and direction control for the transaxle 10. Again, a free wheel control override is preferably included (in the passage section 62).

In this self-contained transmission of FIG. 6, the output shaft 14A is unitary. This eliminates the need for the coupling 29 of the separate power unit 13 embodiment of FIG. 1. This also shortens the length of the transmission at this point due to the elimination of the coupling 29 and the need for a separate wall for the power unit 13A.

In the preferred embodiment of the invention, the axis of rotation of the shafts of the power unit 13 are parallel to the output of the transmission. Further, all shafts between the power unit 12 and output shaft 29 are also parallel. This increases the efficiency of the transaxle 10 by eliminating angular power shifts. In addition, the only angular power shift that does exist in the transaxle 10 is the relatively high speed bevel gear connection 30, 31, and a high speed angular transfer is relatively efficient.

The output shaft 14 drives the first drive gear 34 for the reduction gear train encased in the casing 11. The power shaft 14 also serves as the brake shaft due to the location of the brake operating mechanism 32 off of an end thereof that protrudes from the casing 11. In the embodiment of FIG. 1, a ball bearing and a needle bearing support between the shaft 14 and the casing 11 allows rotation of the shaft 14 in respect thereto. In the embodiment of FIG. 6, two needle bearings 80 support the output shaft 14A. Again, another bearing and wall are eliminated. The gear 34 on the shaft 14 drives the ring gear 37 of the differential 17 through two intermediary gears 35, 36. The gears 35, 36 are fixedly mounted on shafts 15, 16 which shafts, in turn, are rotatably mounted to the casing by bearings (not shown). —As shown in the preferred embodiment of FIG. 2, the axis of the shaft can be drawn intersecting a second line drawn through the axis of rotation of the differential 17 and the axis of rotation of the intermediate shaft 15 with such first line able to intersect at an angle of 90° in respect to such second line. The axis of shaft 14 is thus between the axis of 17 and the axis of 15. The axis of the shaft 14 is also located such that a third line from said axis can be drawn intersecting a fourth line drawn through the axis of rotation of the first intermediate shaft 15 and the second intermediate shaft 16 with such third line able to intersect at an angle of 90° in respect to such fourth line. The axis of rotation of the shaft 15 is located on the opposite side of the axis of rotation of the shaft 14 from the axis of rotation of the shaft 16. This double back design reduces the longitudinal length of the hydrostatic transaxle 10. In addition, the axis of rotation of the shaft 16 is beneath a line drawn through the axis of rotation of the differential 17 and the intermediate shaft 15. This design further shortens the longitudinal length of the casing 10. Note that in certain applications, the orientations of the axes of rotation of the various shafts 12, 14, 15, 16, and 17 may be relocated. For example, if a power unit 13 had a different and smaller spacing between input and output, the shaft 14 could be shifted towards the shaft 12 to have an axis of rotation on the other side of shaft 15 from shaft 16. As an additional example, the shafts 16, 15, and 14 could be aligned between shafts 12 and 17 so as to produce a very shallow casing 11 (albeit long). Other shaft orientations could also be utilized as desired.

The portions of the compound gears 34, 35, 36, and 37 provide for a triple reduction between the output 28 of the hydrostatic power unit 13 and the transaxle half shafts 18. The first reduction is the 15 tooth gear 34 on shaft 14 to 40 toothed large gear 35 on the shaft 15. This provides for a 2.66 reduction in the speed of rotation between the shafts 14, 15. In turn, a 14 tooth small gear 35 on the shaft 15 drives a 38 toothed large gear 36 on the shaft 16. This provides for a 2.71 reduction for the speed of rotation between these two shafts 15, 16. Lastly, a thirteen tooth small gear 36 on the shaft 16 in turn drives the fifty-five tooth ring gear 37 for a differential mechanism 17. This provides for a 4.23 reduction in the speed between this shaft 16 and the differential 17. The overall reduction between the shaft 14 and the differential 17 is thus 30.5.

The differential 17 is connected to the output half shafts 18 for the transaxle in a spur gear parallel shaft differential.

The separate power unit 13 embodiment of the invention (FIG. 1) has the advantages of separating the manufacture of the power unit 13 from the manufacture of the rest of the transaxle. Since hydrostatic power units have more restrictive tolerances, the transaxle manufacturing operation can be handled by less trained personnel in everyday facilities. In addition, the power unit 13 can be bolted on and off at any time. This facilitates subsequent repair.

The integral power unit 13A embodiment of the invention (FIG. 6) has the advantages of lowering the manufacturing cost and complexity of the transaxle through the elimination of parts. In addition, the transaxle can be made smaller and stronger through a better integration of parts. The integration also encourages repair instead of replacement if the power unit 13A develops problems.

Both embodiments put more power into a smaller area than previously.

In addition to the above, the use of parallel shafts in the transmission in combination with a vertically split casing facilitates the manufacture of and strengthens the transmission. The manufacture is facilitated by having all of the bearing beds for the parallel shafts fully formed—i.e. extending 360° about the bearing. A minimum amount of additional machining is necessary, and this primarily is for the control shafts for the power unit (a rather straight forward and non-critical operation).

Although the invention has been described in its preferred form with a certain degree of particularity, it is to be understood that numerous changes may be made without deviating from the invention as herein after claimed.

I claim:

1. A hydrostatic transaxle for transferring power from an engine to an output axle, comprising
    a) a housing for said transaxle having at least a first and second internal chambers;
    b) an input power shaft mounted in said first internal chamber of said transaxle housing, said input power shaft being drivingly engaged to said engine;
    c) a hydrostatic power unit mounted on said transaxle housing and having a separate hydrostatic unit housing, a pump and motor mounted in said hydrostatic unit housing, said pump connected to a pump shaft having a first end and a second end, said first end extending into said transaxle housing, and said motor connected to a motor shaft having a first end and a second end, said first end into said transaxle housing;
    d) means for driving said pump shaft of said hydrostatic power unit from said input power shaft comprising a first bevel gear fixed to said input power shaft and drivingly engaged to a second bevel gear fixed to said pump shaft at the first end thereof, said pump shaft driving means being mounted in said first internal chamber;
    e) a reduction means drivingly connected to said first end of said motor shaft and mounted in said second internal chamber; and
    f) a differential gear mechanism to power said output axle located in said second internal chamber transaxle housing and being drivingly connected to said reduction means.

2. A hydrostatic transaxle as set forth in claim 1, wherein said second end of said pump shaft extends outside said hydrostatic unit housing and forms an output power take off shaft.

3. A hydrostatic transaxle as set forth in claim 1, wherein said pump shaft is parallel to said motor shaft.

4. A hydrostatic transaxle for transferring power from an engine to an output axle, comprising a housing for said transaxle;

an input power shaft mounted in said transaxle housing, said input power shaft being drivingly engaged to said engine;

a hydrostatic power unit mounted on said transaxle housing and having a separate hydrostatic power unit housing, a pump and motor mounted in said hydrostatic power unit housing, said pump connected to a pump shaft having a first end and a second end, said first end extending inside said transaxle housing, and said motor connected to a motor shaft having a first end and a second end, said first end extending into said transaxle housing;

means for driving said pump shaft of said hydrostatic power unit from said input power shaft comprising a first bevel gear fixed to said input power shaft and drivingly engaged to a second bevel gear fixed to said pump shaft at the first end thereof;

a reduction means drivingly connected to said first end of motor shaft;

a differential gear mechanism to power said output axle and located in said transaxle housing and being drivingly connected to said reduction means; and wherein said second end of said pump shaft extends outside said hydrostatic unit housing and forms an output power take off shaft.

5. A hydrostatic transaxle as set forth in claim 4, wherein said pump shaft is parallel to said motor shaft.

6. A hydrostatic transaxle for transferring power from an engine to an output axle, comprising a housing for said transaxle having at least a first and second internal chambers;

an input power shaft mounted in said first chamber of said housing, said input power shaft being drivingly engaged to said engine;

a hydrostatic pump and motor including a center section mounted inside said second chamber of said transaxle housing, said center section separating said housing into said first and second internal chambers, said pump connected to a pump shaft having a first end and a second end, and said motor connected to a motor shaft having a first end and a second end;

means for driving said pump shaft of said hydrostatic pump from said input power shaft comprising a first bevel gear fixed to said input power shaft and drivingly engaged to a second bevel gear fixed to said pump shaft at the first end thereof, said pump shaft driving means mounted in said first chamber of said housing;

a reduction means mounted in said first chamber of said housing and drivingly connected to said first end of said motor shaft; and a differential gear mechanism located in said first chamber of said housing and being drivingly connected to said reduction means.

7. A hydrostatic transaxle as set forth in claim 6, wherein said second end of said pump shaft extends outside said housing and forms a output power take off shaft.

8. A hydrostatic transaxle as set forth in claim 6, wherein said motor shaft is mounted parallel to said pump shaft.

9. A hydrostatic transaxle for transferring power from an engine to an output axle, comprising a housing for said transaxle;

an input power shaft mounted in said housing, said input power shaft being drivingly engaged to said engine;

a hydrostatic pump and motor mounted in said housing, said pump connected to a pump shaft having a first end and a second end, and said motor connected to a motor shaft and having a first end and a second end;

means for driving said pump shaft of said hydrostatic pump from said input power shaft comprising a first bevel gear fixed to said input power shaft and drivingly engaged to a second bevel gear fixed to said pump shaft at the first end thereof;

a reduction means drivingly connected to first end of said motor shaft;

a differential gear mechanism located in said housing and being drivingly connected to said reduction means; and wherein said second end of said pump shaft extends outside said housing and forms a output power take off shaft.

10. A hydrostatic transaxle as set forth in claim 9, wherein said motor shaft is mounted parallel to said pump shaft.

11. A hydrostatic transaxle as set forth in claim 9, wherein said reduction means is mounted in said housing parallel to said pump shaft and said motor shaft.

12. A hydrostatic, transaxle for transferring power from an engine to an output axle, comprising a housing for said transaxle having at least a first and second internal chambers;

an input power shaft mounted in said first chamber of said housing, said input power shaft being drivingly engaged to said engine;

a hydrostatic pump and motor including a center section mounted inside said second chamber of said transaxle housing wherein said center section separates said housing into said first and second internal chambers, said pump connected to a pump shaft having a first end and a second end, and said motor connected to a motor shaft having a first end and a second end;

means for driving said pump shaft of said hydrostatic pump from said input power shaft, said driving means being mounted in said first chamber of said housing;

a reduction means mounted in said first chamber of said housing and drivingly connected to first end of said motor shaft; and a differential gear mechanism located in said first chamber of said housing and being drivingly connected to said reduction means.

13. A hydrostatic transaxle as set forth in claim 12, wherein said second end of said pump shaft extends outside said housing and forms a output power take off shaft.

14. A hydrostatic transaxle as set forth in claim 12, wherein said means for driving said pump shaft of said hydrostatic pump from said input power shaft comprises a first bevel gear fixed to said input power shaft and drivingly engaged to a second bevel gear fixed to said pump shaft at the first end thereof.

15. A hydrostatic transaxle for transferring power from an engine to an output axle, comprising a) a housing for said transaxle having at least a first and second internal chambers;

b) an input power shaft mounted in said first internal chamber of said transaxle housing, said input power shaft bearing drivingly engaged to said engine;

c) a hydrostatic pump and motor connected to said transaxle housing and located in a separate hydrostatic housing, said pump connected to a pump shaft having a first end and a second end, said first end extending into said transaxle housing, and said motor connected to a motor shaft having a first end and a second end, said first end extending into said transaxle housing;

d) means for driving said pump shaft from said input power shaft comprising a first bevel gear fixed to said input power shaft and drivingly engaged to a second bevel gear fixed to said pump shaft at the first end thereof, said pump shaft driving means being mounted in said first internal chamber;

e) a reduction means drivingly connected to first end of said motor shaft and mounted in said second internal chamber; and f) a differential gear mechanism to power said output axle located in said second internal chamber transaxle housing and being drivingly connected to said reduction means.

16. A hydrostatic transaxle as set forth in claim 15, wherein said second end of said pump shaft extends outside said hydrostatic unit housing and forms an output power take off shaft.

17. A hydrostatic transaxle as set forth in claim 15, wherein said pump shaft is parallel to said motor shaft.

18. A hydrostatic transaxle for transferring power from an engine to an output axle, comprising a housing for said transaxle;

an input power shaft mounted in said housing and being drivingly engaged to said engine;

a hydrostatic pump and motor connected to said transaxle housing and located in a separate hydrostatic housing, said pump connected to a pump shaft having a first end and a second end, said first end extending into said transaxle housing, and said motor connected to a motor shaft having a first end and a second end, said first end extending into said transaxle housing;

means for driving said pump shaft from said input power shaft comprising a first bevel gear fixed to said input power shaft and drivingly engaged to a second bevel gear fixed to said pump shaft at the first end thereof;

a reduction means drivingly connected to first end of said motor shaft;

a differential gear mechanism to power said output axle located in said transaxle housing and being drivingly connected to said reduction means; and wherein said second end of said pump shaft extends outside said hydrostatic unit housing and forms an output power take off shaft.

19. A hydrostatic transaxle as set forth in claim 18, wherein said pump shaft is parallel to said motor shaft.

* * * * *